July 12, 1955 A. J. STEINTHAL 2,713,139
MOTOR CONTROL SYSTEM FOR SHROUD LINE METER
Filed May 10, 1951
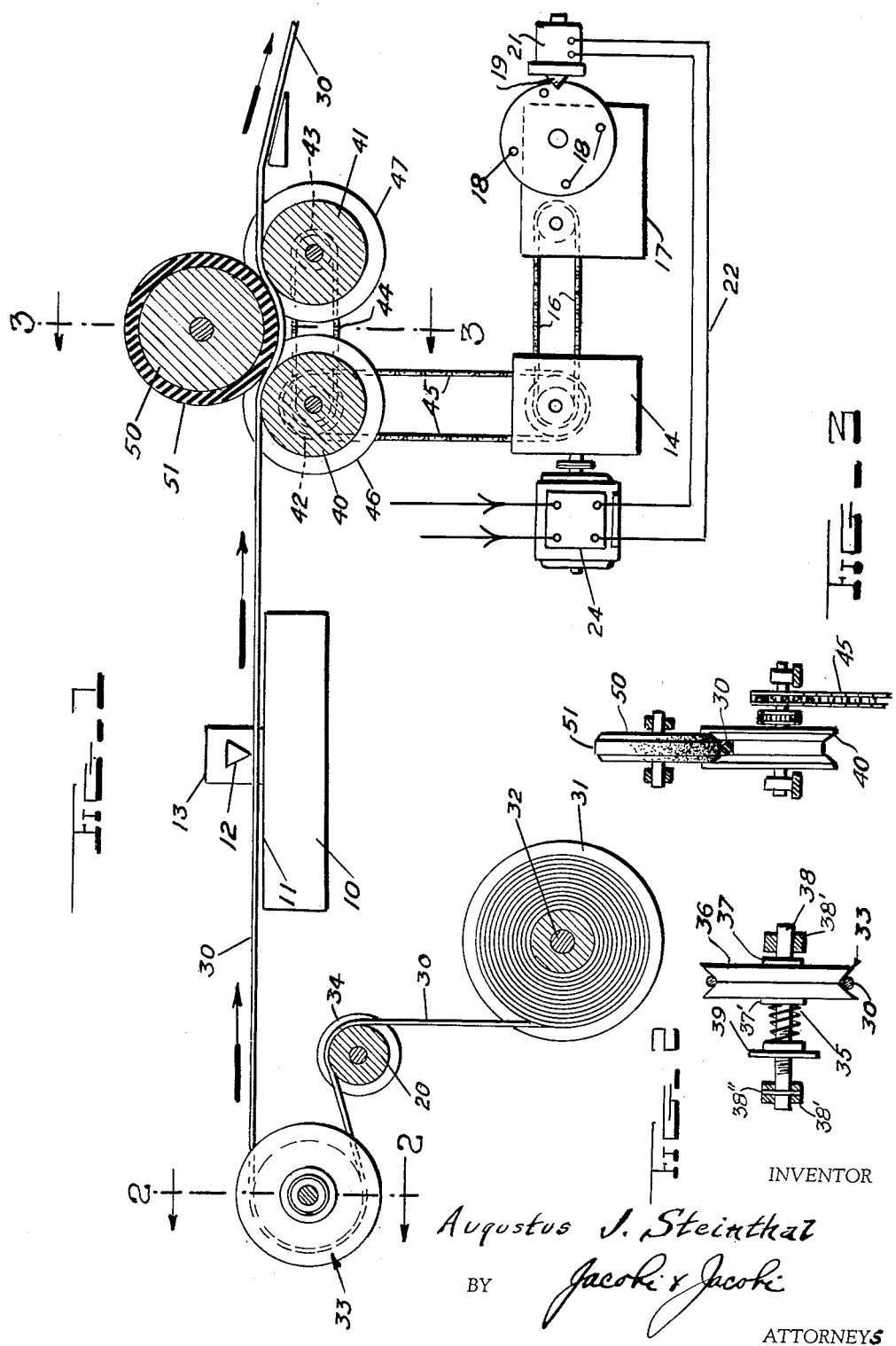
INVENTOR
Augustus J. Steinthal
BY Jacobi & Jacobi
ATTORNEYS ns
2,713,139

MOTOR CONTROL SYSTEM FOR SHROUD LINE METER

Augustus John Steinthal, New York, N. Y.

Application May 10, 1951, Serial No. 225,623

1 Claim. (Cl. 318—470)

This invention relates to measuring instruments and more particularly to meters for the determination of the stretched length of a shroud line, such as employed in the construction and use of parachutes.

The invention has for its objects the provision of a new and improved shroud line meter that will avoid one or more disadvantages and limitations of prior art.

Another object of this invention is to provide a new and improved shroud line meter that will enable lines, ropes, strands, cables, or the like, to be stretched and measured, so they may be cut off accurately and expeditiously for the work they are intended for.

A further object of this invention is to provide a new and improved shroud line meter that will require small space comparatively in its operation and use.

A further object of the invention is to provide a new and improved shroud line meter, that will greatly reduce the amount of floor area required for the measuring of shroud lines for parachutes, and the like, where the lines must given a working stretch during measuring and the difference between normal and stretching length determined cooperatively in the calculated result.

A still further object of the invention is to provide a new and improved shroud line meter, that will be compact, simple in structure, effective in operation and economical to manufacture.

Other objects of this invention will be indicated as the invention is described.

For a clearer understanding of the invention, and the objects thereof, reference is made to the accompanying drawing. This drawing, in conjunction with the following description, illustrates a particular form of the invention by way of example, not of limitation, while the claim included emphasizes the scope of the invention.

In the accompanying drawing, forming a part of this application,

Figure 1 is a schematic outline of a shroud metering machine embodying this invention and including its main components;

Figure 2 is a vertical section, as seen on line 2—2 of Figure 1, looking in the direction of the arrows, and showing particularly the tension brake used in this embodiment; and Figure 3 is a sectional view partly in elevation, taken on line 3—3 of Figure 1, showing particularly the tightening and metering components of the machine.

Similar reference numerals pertain to the same parts throughout the drawing.

The lines, strands, cords or cables, as they may be termed, and used for parachute equipment are subjected to stresses that create strains of appreciable magnitude. The amount of stress will vary according to the load and other incidental conditions. When stress is applied suddenly, same causes considerable lengthening of the lines and affects in proportion the material used in the parachute. The material of the parachute is designed and arranged to take care of its own strains and stresses, and is not a subject to be treated in this description.

However, the stretching of the lines is a matter of great importance and must be known before they are attached to the parachute that supports the same. The existing practice employed to determine the "stretch" is to lay the lines out on the flat surface of a table and while so arranged, to apply tension through the use of a weight of predetermined value. The lines are held rigidly at one end or at a selected portion, and passing over the edge of the table are pulled on at their free ends by the weight. The length so stretched is then measured.

With the development of the more modern types of parachutes, such as those employed to deposit trucks, munitions, and other equipment, their size or floating areas become enormous. The lines attached to them, or to be attached, necessarily become so long that the use of the conventional table becomes impracticable. To continue using tables for these larger sizes in the same way as used for the smaller sizes would require furniture extended over lengths of hundreds of feet. In addition, the lines would not be stretched properly and no adequate means for checking up their correctness as to extent of stretch in any other operational way, would be provided. Furthermore, the matter of labor and general costs in this instance would become excessive.

The machine embodying the present invention has been designed to avoid these objections and although shown schematically can be appreciated structurally. The table employed has been limited to that of a small desk-size unit, with all the operational components close by and accessible to the operator. It includes all the features deemed desirable at the present time and provides not only for the measurement of the "stretch" but also for the marking of the lines at predetermined and desirable locations.

This will be appreciated in the form of the invention illustrated in the drawing, wherein a table 10 provides a plane horizontal upper surface 11 over which the line 30 is extended and stretched. The table has a marking instrument 12 suspended by a bracket 13 mounted on the table. The marker instrument is aligned with the line 30 as it passes under it over the table so that by the manipulation of its brush (not shown) or other marking device, it is possible to impress a visual notation that may be identified when needed. This marker is intended to be actuated by the operator at his will.

The line 30 is directed to the machine location from a reel 31, preferably mounted on a supporting bracket (not shown), on which a shaft 32 passing through the reel 31 rests. The positioning of the reel on the bracket enables it to rotate and unwind its line 30 freely. The line 30 runs vertically up from the reel 31 and passes over an idler 20 of the peripherally grooved type. The idler is suitably supported and rotates as the line 30 is pulled thereover. The line is directed rearwardly at an approximate right angle to the direction of its travel from the reel 31 and is then directed over a braking drum 33, supported a suitable distance from the idler. This braking drum 33 is supported in position to direct the line from its circumference to the table top 11.

The braking drum 33, as best shown in Fig. 2, comprises a pulley 36 rotatably and slidably mounted on the shaft 38 which is fixed against rotation in supports 38' by a pin 38" or other suitable means. A washer 37 is fixed to the shaft 38 to provide an abutment for one side of the pulley 36 and engaging the opposite side of the pulley 36 is washer 37' slidably received on the shaft 38. A compression spring 35 is received on the shaft 38 in engagement with the washer 37'. The force exerted by spring 35 against washer 37' is controlled by a nut 39 threadedly received on shaft 38 and consequently, washers 37 and 37' provide an adjustable brake for resisting rotation of the pulley 36. The rope or line 30 when pulled over the pulley 36 is stretched to a degree depending upon the adjustment of nut 39, but at the same time, the rope or line 30 is permitted to travel continuously to and along the table surface 11.

The line 30 extends from the table 10 to a pair of rollers 40 and 41. These rollers are supported on axles and bearings to permit them to rotate in the same general plane as that of the drum. They are placed close to each other and suitable adjusting devices may be provided to vary the spacing. They have sprockets 42 and 43 rigidly attached to them at one side to enable them to rotate together under the action of a chain 44, and from a driving chain 45. They have bevelled peripheral flanges 46 and 47, respectively, to frictionally engage the line 30 and pull it away from the table 10. A pressure roller 50 with an exterior covering of rubber-like material 51 is located above and between the rollers 40 and 41 in such a position on its supporting bearings (not shown) as to depress the line 30 in a wave-like contour as it travels between them. At the same time, this arrangement affords the necessary pulling torque required to pull the line against the tension and resistance induced by the braking drum 33.

The flanges have indices engraved on or otherwise applied to them to indicate to the operator the length at which the line is to be marked off. The indices and circumferences of the rollers 40 and 41 are preferably arranged to indicate a predetermined length of line travelled for each revolution. They are coordinated with the marker 12 to facilitate the dividing of the line 30 into the desired lengths.

The rollers 40 and 41 are driven through the chain transmission 45 by a motor 24 through a speed changer 14. The speed changer 14 also through a transmission 16 operates a timing mechanism 17 at a predetermined rate and simultaneously with the operation of the rollers. This timing mechanism 17 includes a disk with four pins 18 thereon. During rotation of the disc, the pins 18 actuate a resilient pushbutton 19 of a switch 21, so that the motor 24 will be stopped and started through opening and closing of the circuit 22. The switch 21 is of the toggle type and is provided with an operating plunger having a push button 19 at one end to open the switch, as described above, and a finger engaging portion 19' at the opposite end to facilitate manual closing of the switch. The operator during the stop period operates the marker 12 and checks off the line 30 at a designated point. Then he actuates the switch 21 and the motor is again started and operated until the next pin 18 contacts the switch button and again stops the motor.

The components including the reel 31, idler 20, brake drum 33, table 10, rollers 40, 41 and 50, motor 24, timer 17 and speed changer 16 are preferably incorporated on a single structure and not necessarily separated as shown in Figure 1. In this form, the construction is simple, compact, accessible and will work effectively under the supervision of a single operator. Through this structure, time and effort are saved and the work accomplished expeditiously and accurately.

While the invention has been outlined more or less in the form of a diagrammatic structure, it will, of course, be understood that the construction may be assembled from the components indicated into a composite machine, functioning in the same manner, by those skilled in the art. The structure shown and described, therefore, is intended to cover such equipment broadly and within the scope of the appended claim.

From the foregoing description of the construction of my improved apparatus, the method of assembly and the operation thereof will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

I claim:

In a motor operated drive mechanism, a transmission, a motor in driving relation to said transmission, a control device driven from said transmission and including a rotary shaft and a disk mounted thereon and carrying a plurality of pins projecting laterally from a side face of the disk and spaced from each other circumferentially thereof, and a switch for effecting starting and stopping of the motor mounted adjacent said disk and having operating means manually movable to a closed position to start the motor, said operating means projecting over one face of said disk and disposed in the path of travel of said pins and engageable individually and successively by the pins for causing movement of the operating means to an opened position during rotation of the disk.

References Cited in the file of this patent

UNITED STATES PATENTS

| | | |
|---|---|---|
| 31,351 | Hook | Feb. 5, 1861 |
| 1,548,678 | Goodridge | Aug. 4, 1925 |
| 1,731,403 | Weaver | Oct. 15, 1929 |
| 1,946,313 | Daniels | Feb. 6, 1934 |
| 2,081,102 | Blue | May 18, 1937 |
| 2,091,522 | Perry | Aug. 31, 1937 |
| 2,307,046 | Johnson et al. | Jan. 5, 1943 |
| 2,339,194 | Reichelt | Jan. 11, 1944 |
| 2,445,607 | Ghetto | July 20, 1948 |
| 2,464,389 | Grau | Mar. 15, 1949 |
| 2,479,920 | Gambrill | Aug. 23, 1949 |

FOREIGN PATENTS

| | | |
|---|---|---|
| 527,961 | Germany | June 24, 1931 |